(12) United States Patent
Lin (10) Patent No.: US 8,585,437 B2
(45) Date of Patent: Nov. 19, 2013

(54) ANGLE PANEL

(75) Inventor: Yen-Lin Lin, New Taipei (TW)

(73) Assignee: Jyh Eng Technology Co., Ltd., New Taipei (TW)

( * ) Notice: Subject to any disclaimer, the term of this patent is extended or adjusted under 35 U.S.C. 154(b) by 144 days.

(21) Appl. No.: 13/293,200

(22) Filed: Nov. 10, 2011

(65) Prior Publication Data

US 2013/0122742 A1    May 16, 2013

(51) Int. Cl.
*H01R 13/60* (2006.01)

(52) U.S. Cl.
USPC ................. 439/540.1; 439/532; 439/676

(58) Field of Classification Search
USPC ...................... 439/540.1, 676, 532
See application file for complete search history.

(56) References Cited

U.S. PATENT DOCUMENTS

| | | | |
|---|---|---|---|
| 4,596,436 A * | 6/1986 | Kraemer et al. ............... 439/701 |
| 4,842,551 A * | 6/1989 | Heimann ....................... 439/502 |
| 4,875,880 A * | 10/1989 | Welch et al. .................. 439/536 |
| 4,883,433 A * | 11/1989 | Lane .......................... 439/607.01 |
| 5,366,388 A * | 11/1994 | Freeman et al. ........... 439/540.1 |
| 5,773,763 A * | 6/1998 | Stachulla ..................... 174/135 |
| 6,086,415 A * | 7/2000 | Sanchez et al. ............ 439/540.1 |
| 6,123,579 A * | 9/2000 | Ping .............................. 439/557 |
| 6,273,752 B1 * | 8/2001 | Martin et al. ............... 439/540.1 |
| 6,537,106 B1 | 3/2003 | Follingstad |
| 6,736,670 B2 | 5/2004 | Clark et al. |
| 6,866,541 B2 | 3/2005 | Barker et al. |
| 7,112,090 B2 * | 9/2006 | Caveney et al. ........... 439/540.1 |
| 7,300,308 B2 | 11/2007 | Laursen et al. |
| 7,343,078 B2 | 3/2008 | Spisany et al. |
| 7,488,205 B2 | 2/2009 | Spisany et al. |
| 7,529,458 B2 * | 5/2009 | Spisany et al. ................ 385/137 |
| 7,867,022 B2 * | 1/2011 | Davison et al. ............ 439/540.1 |
| 2004/0209515 A1 * | 10/2004 | Caveney et al. ........... 439/540.1 |
| 2004/0229501 A1 * | 11/2004 | Caveney et al. ........... 439/540.1 |
| 2005/0197005 A1 * | 9/2005 | Bentley ..................... 439/540.1 |
| 2007/0032129 A1 * | 2/2007 | Kim et al. .................. 439/540.1 |
| 2009/0053923 A1 * | 2/2009 | Navarro et al. ............... 439/489 |
| 2009/0239413 A1 * | 9/2009 | Milette ...................... 439/540.1 |
| 2010/0068923 A1 * | 3/2010 | Tabet ......................... 439/540.1 |

* cited by examiner

*Primary Examiner* — Briggitte R Hammond
(74) *Attorney, Agent, or Firm* — Guice Patents PLLC (57) ABSTRACT

An angle panel having openings cut through a flat base thereof for holding network jacks individually, and a backwardly extending retaining structure located on one side of each opening for securing one respective network jack for receiving a respective mating network plug to keep the plug hole of the installed network jack in an oblique position relative to the flat base. When attaching a network jack to the angle panel, opposing upper hook and lower hook of the attached network jack are respectively hooked on the retaining structure at the corresponding opening and the flat base of the angle panel.

6 Claims, 7 Drawing Sheets

ANGLE PANEL

BACKGROUND OF THE INVENTION

1. Field of the Invention

The present invention relates to patch panels for telecommunication application and more particularly, to an angle panel for holding network jacks for the connection of mating network plugs, which facilitates arrangement of network cables in a wire organizer and maintains excellent electrical characteristics.

2. Description of the Related Art

Conventional patch panels commonly have a flat base for the mounting of jack modules or keystone jacks at the back side thereof. After installation of jack modules or keystone jacks in the flat base of a patch panel, the flat base is then affixed to a rack. A jack module or keystone jack for this purpose has a plug hole at the front side for the insertion of a matching plug module, keystone plug, fiber optic plug or coaxial cable plug of a cable or network line. After installation of matching plug modules, keystone plugs, fiber optic plugs or coaxial cable plugs in a patch panel, the cables or network lines are then arranged in a cable organizer.

However, when inserting a plug into the plug hole of a jack at a patch panel, the insertion direction is perpendicular to the flat base of the patch panel. At this time, the cable or network line at the back side of the plug will be heavily curved, easily leading to core wire breaking or component damage, or causing change of electrical properties.

Therefore, there is a strong demand for a measure to prevent the aforesaid heavy cable curving problem.

U.S. Pat. No. 6,537,106 discloses a patch panel design, entitled "Telecommunicaons patch panel with angled connector modules". According to this design, connector modules are rotatably mounted to a frame member. By means of rotating the connector modules relative to the frame member, the connector jacks and the connector modules are arranged in linear arrays perpendicular to the axis of rotation, maintaining transmission characteristics.

U.S. Pat. No. 6,736,670 discloses a patch panel design, entitled "Angled RJ to RJ patch panel". According to this design each of the electrical connector assemblies comprises a first jack presented on a first side of a panel frame of the patch panel and a second jack electrically linked to the first jack to form a jack pair and presented on a second side of the panel frame. Both the first jack and the second jack are presented at an angle with respect to the panel frame, and both the first jack and the second jack may be engaged using a patch cord. The first and second jack of each jack pair are at a 90-degree angle relative to one another.

U.S. Pat. No. 6,866,541 discloses a patch panel design, entitled "Angled patch panel with cable support bar for network cable racks". According to this design, the patch panel includes a patch panel frame and rack mounting plates. The frame forms a central section having a longitudinal width sized to fit within the network rack. The rack mounting plates are provided on opposite longitudinal ends of the central section and allow the panel to be mounted to a network rack. The central section includes two panel sections angled outwardly in an inverted V-shapes, and the central section has mounted thereon a plurality of cable connectors that receive cabling on the front side and the rear side of the patch panel frame, reducing the curving angle of cables.

U.S. Pat. No. 7,300,308 discloses an angled patch panel that makes an improvement on U.S. Pat. No. 6,866,541. According to this design, the angled patch panel has left and right end panel sections and left and right central panel sections. Each section has at least one connector mounting aperture. The patch panel comprises left and right mounting plates, and left and right end rearwardly extending extension plates. The left end panel section extends from the left end extension plate inwardly and forwardly. The right end panel section extends from the right end extension plate inwardly and forwardly. The left central panel section extends from the left end panel section inwardly. The right central panel section extends from the right end panel section inwardly and forwardly.

U.S. Pat. No. 7,343,078 discloses a patch panel design, entitled "Patch panels with communications connectors that are rotatable about a vertical axis", which comprises a frame having mounting features at opposite lateral ends for mounting the patch panel to the network rack, a bezel having outlet apertures, and communication outlets mounted in respective ones of the outlet apertures. Each outlet comprises a plurality of electrical contacts within a plug aperture configured to receive a mating plug. The plug aperture has a generally horizontal axis for receiving the mating plug and further includes a plug latch recess. The outlets are oriented such that the plug latch recess is positioned on one side edge of the plug aperture.

U.S. Pat. No. 7,488,205 discloses a fixed angled patch panel, which, similar to U.S. Pat. No. 7,343,078, comprises a plurality of openings for receiving bezels. The bezels may be connected to the patch panel by a snap-lock arrangement. Each bezel comprises at least one port for receiving a jack unit. The ports open in an angled direction toward a lateral side of the bezel.

The aforesaid various prior art designs are still not satisfactory in function and have drawbacks as follows:

The structure of U.S. Pat. No. 6,537,106 is excessively complicated, not easy to assemble in the production line. U.S. Pat. Nos. 6,736,670 and 7,343,078 are designed for mounting of particular network jacks. Other network jacks of which the housing has a retaining portion at the top side and a springy arm type hook at the bottom side are not mountable to these patch panels. U.S. Pat. Nos. 6,866,541 and 7,300,308 have the common drawback that the panel protrudes over the rack, and wiring technicians may be injured by the protruding part of the panel accidentally. U.S. Pat. No. 7,488,205 has the drawback that, due to that the ports open in an angled direction toward a lateral side of the bezel, the fabrication of the patch panel requires techniques, increasing the manufacturing cost. Therefore, improvements are required.

SUMMARY OF THE INVENTION

The present invention has been accomplished under the circumstances in view. It is main object of the present invention to provide an angle panel for holding network jacks for the connection of mating network plugs, which is easy to install and inexpensive to fabricate.

It is another object of the present invention to provide an angle panel for holding network jacks for the connection of mating network plugs, which facilitates arrangement of network cables in a wire organizer, avoids core wire damage and maintains excellent electrical characteristics.

To achieve these and other objects of the present invention, an angle panel comprises a flat base, a plurality of openings cut through said flat base for holding network jacks individually, and a retaining structure located on one side of each opening and extending backwardly relative to the flat base for securing one respective network jack having an upper hook and a lower hook for mounting and a plug hole for receiving a mating network plug to keep the plug hole of the installed network jack in an oblique position relative to the flat base. The retaining structure comprises a planar surface that defines with the flat base a predetermined contained angle, and a retaining hole cut through the planar surface for engagement with the upper hook of one respective network jack that has the lower hook thereof hooked on the flat base.

In an alternate form of the present invention, the angle panel comprises a panel body comprising a flat base and a plurality of openings cut through the flat base for holding in each opening of the panel body one respective network jack having an upper hook and a lower hook for mounting and a plug hole for receiving a mating network plug, and a retaining backboard affixed to the back side of the panel body for securing respective network jacks in the openings of the panel body. The retaining backboard comprises a first retaining structure and a second retaining structure corresponding to each opening of the panel body for engagement with the upper hook and lower hook of one respective network jack to keep the respective network jack at the angle panel at an oblique angle.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
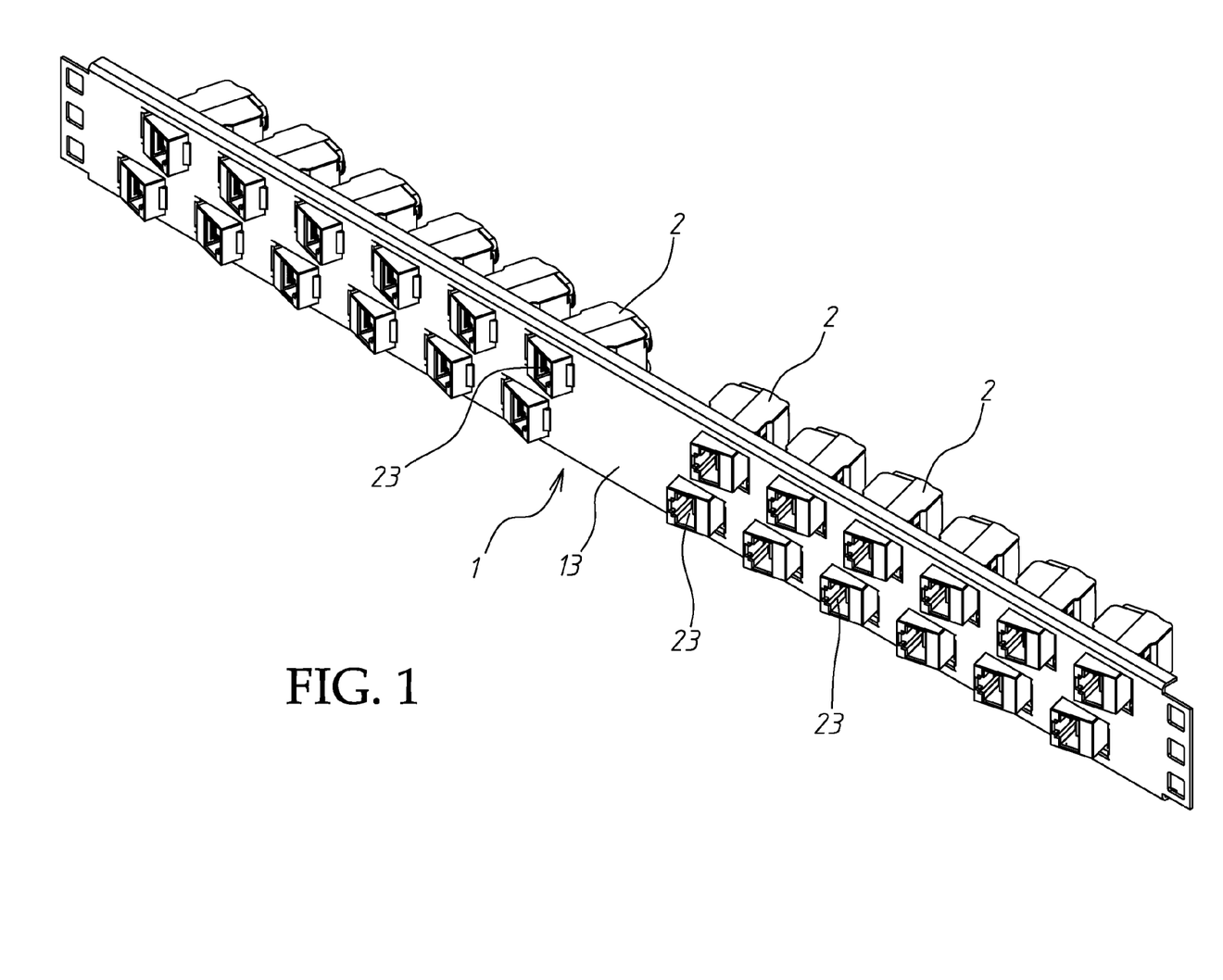
FIG. 1 is an elevational view of an assembly of an angle panel and a set of network jacks in accordance with a first embodiment of the present invention.

Referring to FIG. 1, an angle panel 1 in accordance with a first embodiment of the present invention generally is show for the mounting of a plurality of network jacks, for example, keystone jacks 2.

Figure 2:
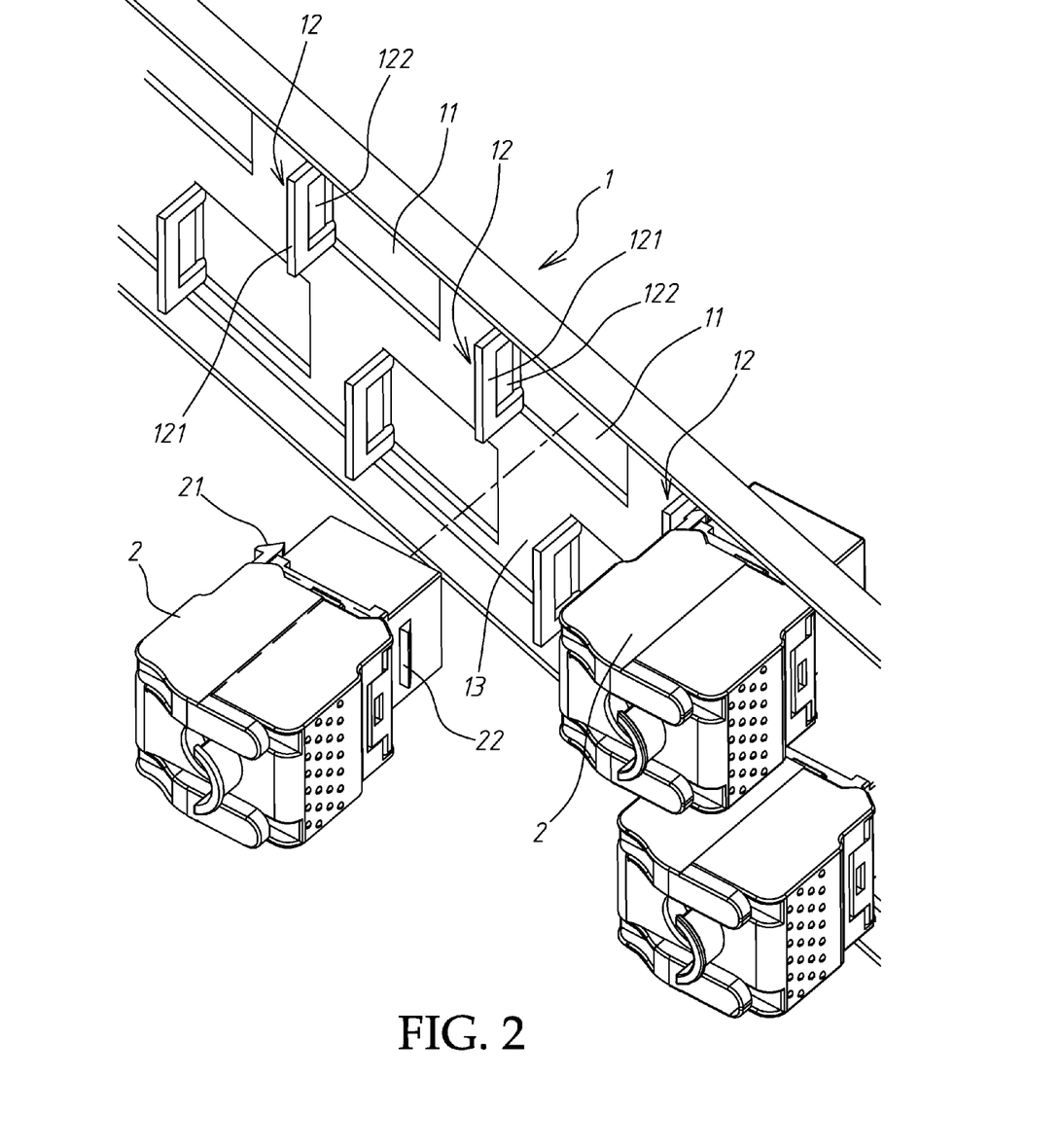
FIG. 2 is an exploded view, in an enlarged scale, of a part of FIG. 1.
Figure 3:
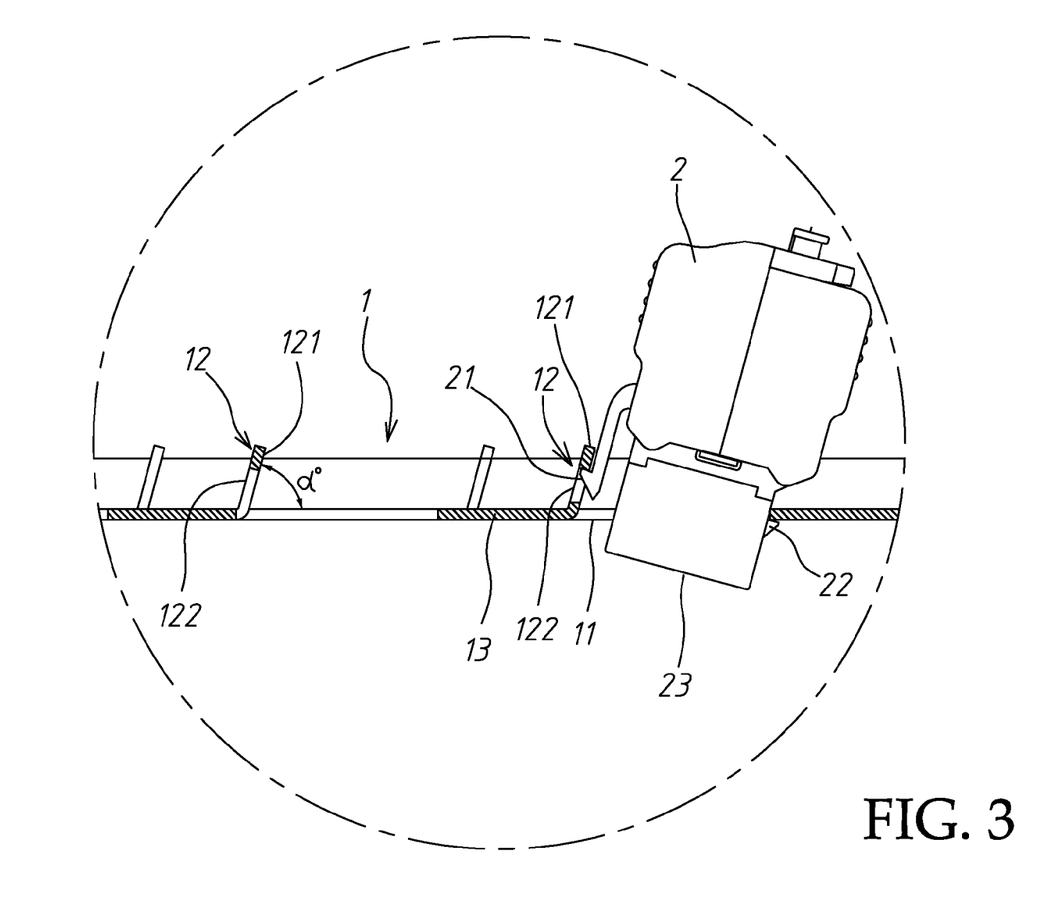
FIG. 3 is s a sectional view, in an enlarged scale, of a part of FIG. 1.

Referring to FIGS. 2 and 3 and FIG. 1 again, the angle panel 1 defines a flat base 13, a plurality of openings 11 cut through the flat base 13, a retaining structure 12 located on one side of each opening 11 and extending backwardly relative to the plane 1. Each retaining structure 12 has a planar surface 121 that defines with the flat base 13 of the angle panel 1 a contained angle $\alpha°$, as shown in FIG. 3, for securing one respective keystone jack 2 that comprises an upper hook 21 and a lower hook 22 arranged at two opposite sides on the same plane.

As illustrated, each retaining structure 12 comprises a retaining hole 122 cut through the planar surface 121. This retaining structure design is not a limitation. Other equivalent designs may be used without departing from the spirit and scope of the invention.

When attaching one keystone jack 2 to one opening 1 of the angle panel 1, the upper hook 21 is forced into engagement with the corresponding retaining structure 12 and the lower hook 22 is hooked on the flat base 13 of the angle panel 1. Subject to the elevation difference between the retaining structure 12 and the flat base 13 of the angle panel 1, the plug hole 23 of the keystone jack 2 is kept in an oblique position, as shown in FIG. 1.

Figure 7:
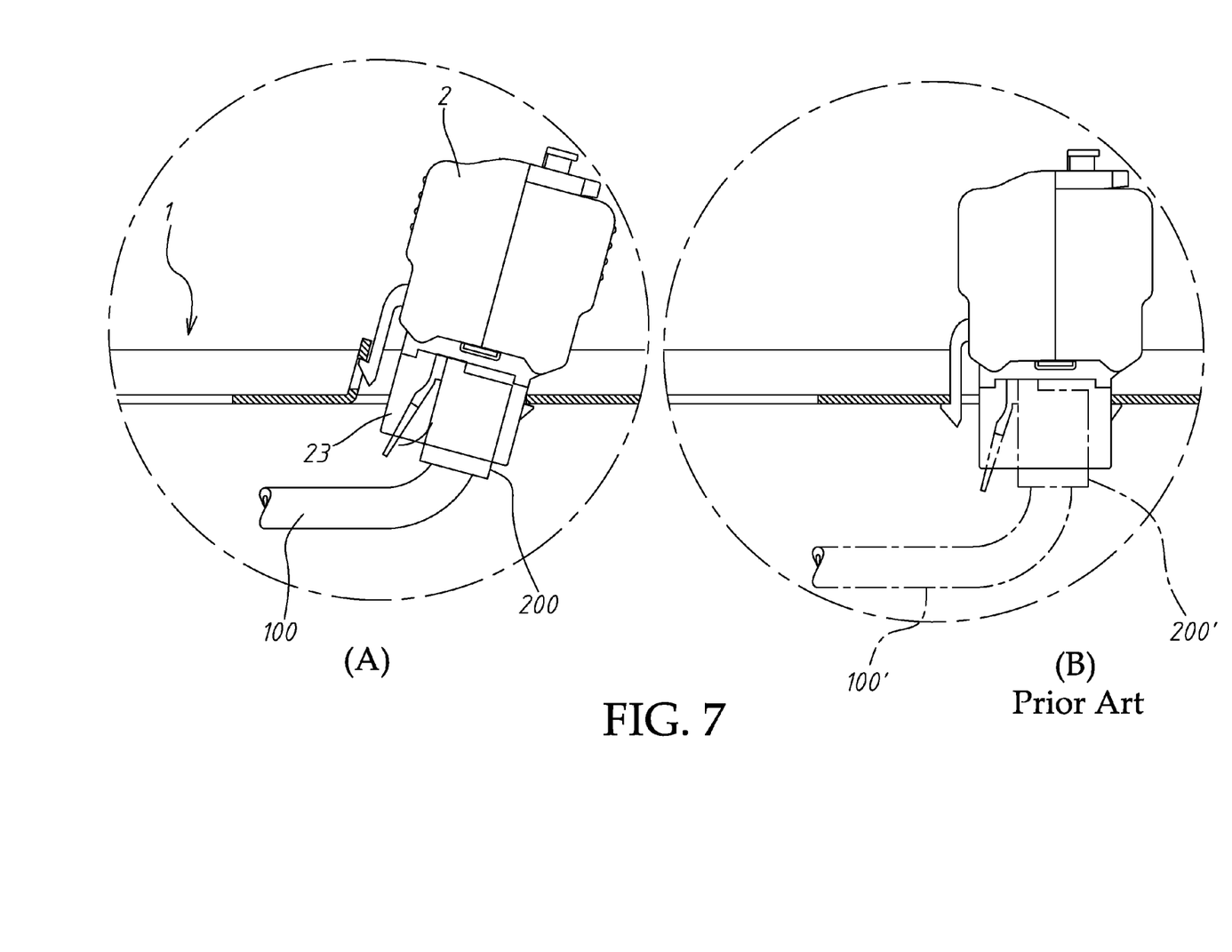
FIG. 7 is a schematic comparison chart illustrating oblique installation of a network plug of a network cable in an angle panel in accordance with the present invention in Part A and vertical installation of a network plug of a network cable in a conventional jack panel in Part B.

Referring also to FIG. 7, after insertion of a keystone plug 200 of a network cable 100 is inserted into the plug hole 23 of one keystone jack 2 at the angle panel 1 at an oblique angle, as shown in Part A, the network cable 100 is curved at a relatively smaller angle of angle when compared to the insertion of a keystone plug 200' of a network cable 100' in the plug hole 23 of a keystone jack at a conventional jack panel at right angles, as shown in Part B. Thus, the invention has better transmission characteristics.

Obviously, the angle panel of the present invention has simple structure and low cost characteristics for the mounting of regular network jacks 2. When a network plug of a network cable is inserted into the plug hole of one network jack at the angle panel, the inserted network plug is kept at an oblique angle relative to the angle panel, facilitating arrangement of the network cable in a wire organizer, avoiding core wire damage and maintaining excellent electrical characteristics.

Figure 4:
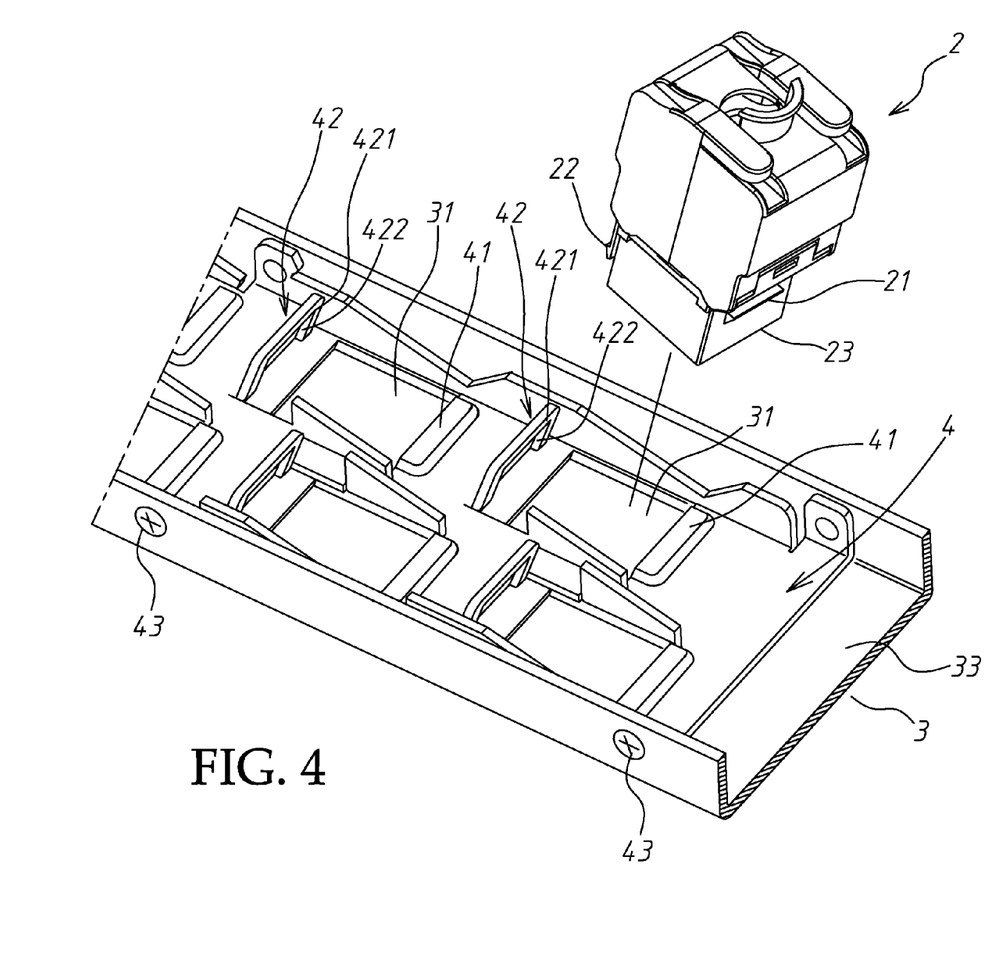
FIG. 4 is an elevational view of a part of an angle panel in accordance with a second embodiment of the present invention.
Figure 5:
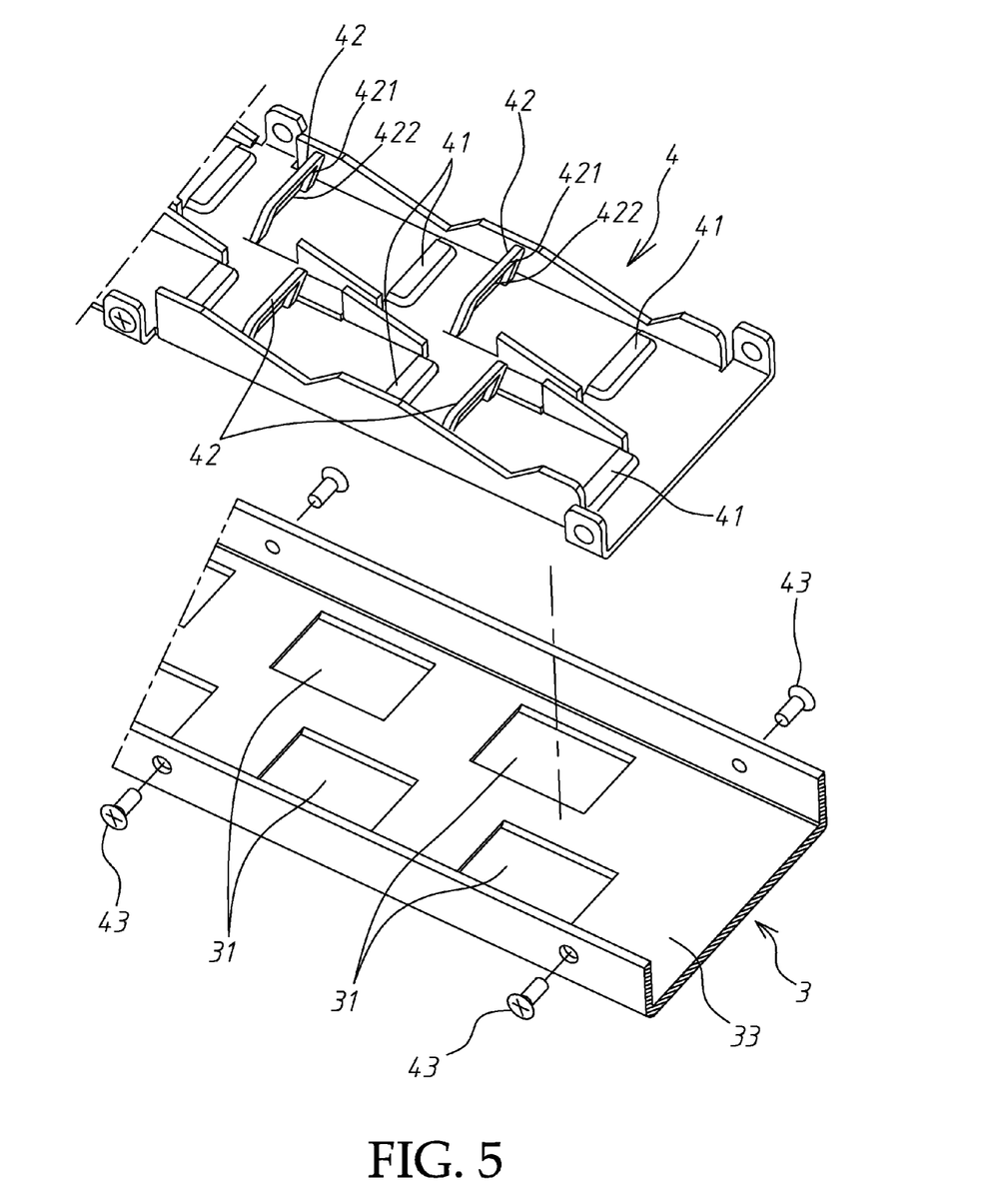
FIG. 5 is an exploded view of a part of the angle panel in accordance with the second embodiment of the present invention.

FIGS. 4 and 5 illustrate an angle panel in accordance with a second embodiment of the present invention. According to this second embodiment, the angle panel comprises a panel body 3 and a retaining backboard 4 attached to the back side of the panel body 3. The panel body 3 comprises a flat base 33, a plurality of openings 31 cut through the flat base 33. The retaining backboard 4 comprises a first retaining structure 41 and a second retaining structure 42 corresponding to each opening 31 of the panel body 3 for securing one respective network jack 2 in each opening 31 of the panel body 3, keeping the plug hole 23 of each installed network jack 2 at the angle panel at an oblique angle.

As shown in FIG. 5, the first retaining structure 41 is a backward recess; the second retaining structure 42 comprises a planar surface 421 and a retaining hole 122 cut through the planar surface 421. Further, the retaining backboard 4 is fixedly fastened to the back side of the panel body 3 with screws 43.

Figure 6:
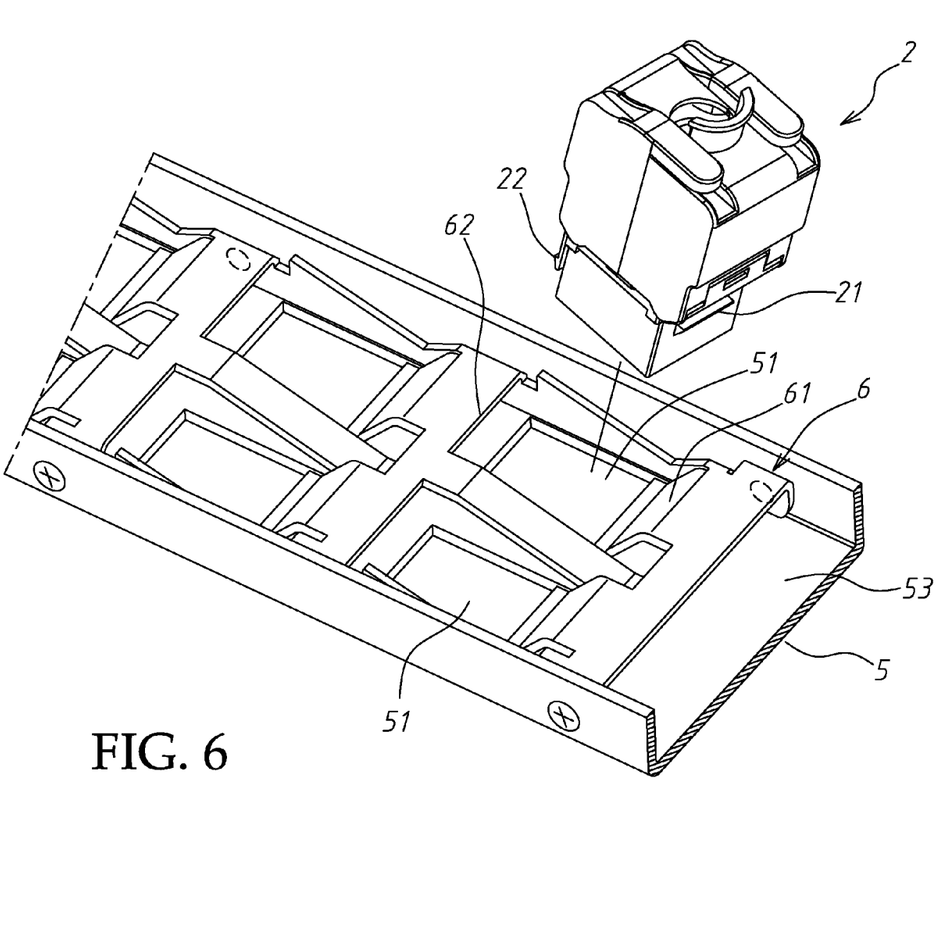
FIG. 6 is an elevational view of a part of an angle panel in accordance with a third embodiment of the present invention.

FIG. 6 illustrates an angle panel in accordance with a third embodiment of the present invention. Similar to the aforesaid second embodiment, the angle panel of this third embodiment comprises a panel body 5 and a retaining backboard 6 attached to the back side of the panel body 5. The panel body 5 comprises a flat base 53, a plurality of openings 51 cut through the flat base 53. The retaining backboard 6 comprises a first retaining structure 61 and a second retaining structure 62 corresponding to each opening 51 of the panel body 5 for securing one respective network jack 2 in each opening 51 of the panel body 5, keeping the plug hole 23 of each installed network jack 2 at the angle panel at an oblique angle. The first retaining structure 61 is a sloping face. The second retaining structure 62 is a plane above the elevation of the sloping face of the first retaining structure 61.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An angle panel comprising:
   a plurality of network jacks, each network jack of said plurality of network jacks has an upper hook and a lower hook located on opposing sides thereof and a plug hole; and
   a flat base having a plurality of openings and a plurality of retaining structures, said plurality of openings being cut through said flat base for holding said network jacks individually, one retaining structure of said plurality of retaining structures being located on one side of each said opening of the plurality of openings and extending outwardly from a rear surface of said flat base, one network jack of said plurality of network jacks being inserted into a corresponding opening of said plurality of retaining structures, said upper hook of each of said plurality of network jacks is connected to a planar surface of a corresponding retaining structure of said plurality of retaining structures located on a rear of said flat base and said lower hook of each of said plurality of network jacks is directly connected to a front surface of said flat base positioning said plug hole of each said network jack in an oblique position relative to said flat base, said front surface and said rear surface are opposing surfaces of said flat base, said planar surface of each said retaining structure is positioned at a predetermined contained angle relative to said flat base.

2. The angle panel as claimed in claim 1, wherein each said retaining structure further comprises a retaining hole cut through said planar surface for engagement with the upper hook of the respective network jack.

3. An angle panel, comprising:
   a panel body comprising a flat base and a plurality of openings cut through said flat base holding in each opening of said panel body one respective network jack having an upper hook and a lower hook for mounting and a plug hole for receiving a mating network plug; and
   a retaining backboard affixed to a back side of said panel body for securing respective network jacks in said openings of said panel body, said retaining backboard comprising a first retaining structure and a second retaining structure corresponding to each opening of said panel body for engagement with the upper hook and lower hook of one respective network jack to keep the respective network jack at the angle panel at an oblique angle, said upper hook of each network jack engaging the first retaining structure at a front surface of the retaining backboard and said lower hook engaging said second retaining structure at a location spaced apart from said front surface of said retaining backboard.

4. The angle panel as claimed in claim 3, wherein said first retaining structure is a backward recess; said second retaining structure comprises a planar surface and a retaining hole cut through said planar surface.

5. The angle panel as claimed in claim 3, wherein said retaining backboard is affixed to the back side of said panel body with screws.

6. The angle panel as claimed in claim 3, wherein said first retaining structure is a sloping face; said second retaining structure is a plane above the elevation of the sloping face of said first retaining structure.

* * * * *